United States Patent [19]
Schmidt et al.

[11] Patent Number: 5,849,238
[45] Date of Patent: Dec. 15, 1998

[54] HELICAL CONFORMAL CHANNELS FOR SOLID FREEFORM FABRICATION AND TOOLING APPLICATIONS

[75] Inventors: Wayde Schmidt, Pomfret Center; Joseph V. Bak, Eastford; Ronald D. White, Coventry; Umesh R. Wamorkar, Colchester, all of Conn.

[73] Assignee: UT Automotive Dearborn, Inc., Dearborn, Mich.

[21] Appl. No.: 883,486

[22] Filed: Jun. 26, 1997

[51] Int. Cl.$^6$ .......................... B29C 33/40; B29C 35/08; B29C 41/02

[52] U.S. Cl. .......................... 264/401; 264/113; 264/123; 264/128; 264/219; 264/308; 264/497; 364/468.26; 364/468.27; 419/43; 419/69

[58] Field of Search ..................................... 264/113, 123, 264/128, 219, 308, 401, 497; 364/468.26, 468.27; 419/43, 69

[56] References Cited

U.S. PATENT DOCUMENTS

| | | | |
|---|---|---|---|
| 4,412,806 | 11/1983 | Gaiser et al. | 425/554 |
| 4,875,848 | 10/1989 | Gellert | 425/549 |
| 4,982,648 | 1/1991 | Bol et al. | 89/14.1 |
| 5,031,483 | 7/1991 | Weaver | 76/107.1 |
| 5,204,055 | 4/1993 | Sachs et al. | 419/2 |
| 5,340,656 | 8/1994 | Sachs et al. | 428/546 |
| 5,387,380 | 2/1995 | Cima et al. | 264/69 |
| 5,427,519 | 6/1995 | Gellert | 425/549 |
| 5,439,622 | 8/1995 | Pennisi et al. | 264/401 |
| 5,501,592 | 3/1996 | Kitamura | 425/547 |
| 5,545,366 | 8/1996 | Lust et al. | 264/225 |
| 5,562,846 | 10/1996 | McKeen | 264/401 X |

OTHER PUBLICATIONS

Thesis of Edward M. Wylonis, III of Massachusetts Institute of Technology, 1995 entitled "Production of Injection Molding Tooling with Conformal Cooling using the Three Dimensional Printing Process".

Thesis of Earl S. Sun, Georgia Institute of Technology, 1995, entitled "Implementation of Low Thermal Inertia Injection Molds using Conformal Passages".

*Primary Examiner*—Leo B. Tentoni
*Attorney, Agent, or Firm*—Howard & Howard

[57] ABSTRACT

A method for forming a tool such as a mold includes the steps of initially selecting a cooling channel configuration for the mold. The initial selected cooling channel is evaluated utilizing a computer program. The program analyzes whether there would be local hot or cool spots in the mold with the initially selected channel. The channel is then modified based upon this evaluation. The modified channel is again subjected to the evaluation. This iterative process continues until an acceptable cooling channel configuration is achieved. The invention utilizes a generally helical cooling channel.

7 Claims, 1 Drawing Sheet

HELICAL CONFORMAL CHANNELS FOR SOLID FREEFORM FABRICATION AND TOOLING APPLICATIONS

BACKGROUND OF THE INVENTION

This invention relates generally to a method for designing a tool or a part and, more particularly, to a method for designing a tool or a part having internal channels.

A mold or tool used for manufacturing a part by either injection molding, thermoplastic molding, thermoset molding, or reactive molding generally has at least one internal channel which is used to transfer heat between a fluid in the channel and the part during a molding cycle. If the part has an inner and an outer contour then the tool generally consists of two parts, a cavity portion and a core portion, which are assembled to form the tool. The inner and outer contour of the part are determined by the spacing between the cavity portion and the core portion of the assembled tool. Both the core portion and the cavity portion generally have at least one internal channel. The internal channel can be used to heat the tool and the part, to cool the tool and the part, or to both heat and cool the tool and the part during different points in the molding cycle. In addition, many parts themselves require internal channels to transfer heat or to deliver fluids.

The placement of internal channels within the tool is somewhat limited by the geometry of the part and the tool. Traditionally in injection molding tools these internal channels have consisted of straight orthogonally intersecting holes drilled into the tool after fabrication. The location of internal channels by this method is highly restricted by the geometry of the part and of the tool. Many times the placement of the internal channels is not even considered until after the tool has been fabricated. Frequently, the placement of the internal channels causes non-homogeneous transfer of heat within the tool. Non-homogeneous heat transfer within molding tools produces parts having internal stresses, increases mold cycle time, lowers part dimensional accuracy, and introduces anisotropic shrinkage within the part.

It has been proposed in the prior art to form helical channels into the tool to receive a cooling fluid. In general, these proposals have required the formation of the channel and an outer surface of the tool or alternatively require the tool to be made up of a series of plates.

It has also been proposed to form tools having conformal cooling channels of non-helical shapes with free form techniques. Generally, a free form technique is a technique of forming a part wherein the part is built up layer by layer.

Therefore, it is desirable to provide a method for designing a tool which produces a tool having at least one internal channel which allows for uniform transfer of heat within the tool.

SUMMARY OF THE INVENTION

In general terms, this invention provides a method for designing a tool with at least one internal channel which will enable uniform heat transfer between a part produced by the tool and a fluid circulating in the channel.

In general, the present invention relates to a method wherein a generally helical channel is formed within a tool by a free form manufacturing technique. The channel is preferably designed dependent upon a number of design factors and through an iterative process. In that way, the channel is designed to address any local cool or hot spots in an initial mold design.

The complete method of the invention for producing a part having only an outer contour comprises the steps of first providing a cavity portion which defines an outer contour of a part and the shape of at least one cavity channel spaced adjacent to the outer contour of the part with the cavity channel generally following the outer contour of the part. Second, defining the physical characteristics of a fluid to be circulated through the cavity channel and the physical characteristics of a material to be molded into the part. Third, defining the physical characteristics of a tool material. Fourth, defining the conditions of a cycle of use of the tool. Fifth, creating a graphic of the outer contour of the part and the cavity channel. Sixth, calculating the theoretical heat transfer between the part and the fluid based on the outer contour of the part, the channel, the physical characteristics of the fluid, the physical characteristics of the material to be molded, the physical characteristics of the tool material, and the conditions of the cycle of use of the tool. Seventh, creating a graphic model illustrating the theoretical heat transfer between the part and the fluid in the cavity channel. Eighth, redefining the shape and position of the cavity channel and then iteratively repeating the fifth, sixth and seventh steps until the graphic model illustrating the theoretical heat transfer is nearly optimal for producing the part. Ninth, converting the nearly optimal graphic model illustrating the theoretical heat transfer between the part and the fluid into a solid form model. Tenth, creating a tool corresponding to the solid form model by a solid freeform method such as three dimensional printing, selective laser sintering, fused deposition modeling, or stereolithography. The tool created has a surface corresponding to the outer contour of the part and includes a cavity channel. Eleventh, machining the tool to a final dimension.

As explained above, when the part being created has both an inner and an outer contour then the tool has two parts a cavity portion and a core portion. The cavity portion defines the outer contour of the part. The core portion defines the inner contour of the part. Thus, when designing a tool to create such a part the method additionally includes the steps of providing a core portion which defines an inner contour of the part and the shape of at least one core channel spaced adjacent to the inner contour of the part with the core channel generally following the inner contour of the part and with the core channel internal to the core portion of the tool. Thereafter, the same steps explained above are carried out to optimize the heat transfer between the fluid in the core channel in the core portion of the tool and the part. The nearly optimal core portion of the tool is also created by the solid freeform method and machined as explained above.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

FIGS. 1–4 illustrate an injection molding tool which could be used to produce a part having the shape of a cylinder with one end sealed. While the method will be described primarily for an injection molding tool, it should be understood that the method of this invention is not restricted to injection molding, but can also be used to create molds for thermoplastic molding, thermoset molding, reactive molding, or blow molding. In addition, the method can be used to design parts having internal channels to transfer heat or to transport fluids.

In general, the present invention discloses a method for optimizing heat transfer within a tool such as a mold. Preferably, an initial cooling channel design is selected, and analyzed through computer program techniques. The channel design is changed through an iterative process until an optimum design has been reached. Preferably, the channel is helical. Once the design has been selected, the mold itself is built through free form techniques. This method will be described in greater detail below.

Figures 1, 2:
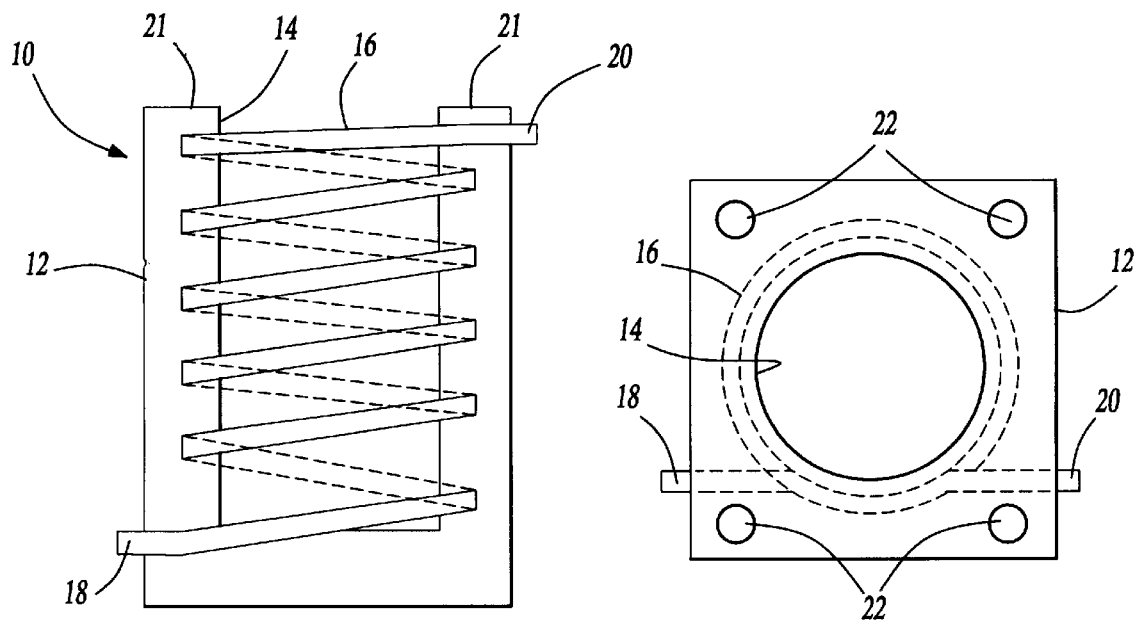
FIG. 1 is a cross sectional view of a cavity portion of a tool having an internal, conformal, helical-shaped channel.
FIG. 2 is a top view of FIG. 1.

In FIG. 1 a cavity portion of a tool for producing a part having an inner contour and an outer contour is shown generally at 10. The cavity portion 10 has an outer rim 12 and an inner rim 14. The outer contour of the part (not shown) is defined by the shape of the inner rim 14. A cavity channel 16 is formed between the outer rim 12 and the inner rim 14. The cavity channel 16 has a first end 18 and a second end 20. The cavity channel 16 provides a passage for a fluid (not shown) to circulate through the cavity portion 10 of the tool. The fluid can be used to either heat or cool the cavity portion 10 depending on the type of molding being performed. For example, if the molding were injection molding a first fluid might be circulated through the cavity channel 16 to heat the cavity portion 10 and then a second fluid could be circulated through the cavity channel 16 to cool the cavity portion 10.

In a thermoset molding the fluid circulated through the cavity channel 16 might only be used to heat the cavity portion 10. The fluid is introduced into the cavity channel 16 at either the first end 18 or the second end 20 and exits from the other end.

In FIG. 1 the cavity channel 16 is shown in the shape of a helix which conformally follows the contour of the inner rim 14. The pitch of the cavity channel helix, its cross sectional shape, and the distance between the cavity channel 16 and the inner rim 14 influence the transfer of heat between the part (not shown) and the fluid in the cavity channel 16. The cavity portion 10 also has a top surface 21.

In the context of this application, the term "generally helical" refers to the cooling channel shape generally centered upon an axis and wrapping upon itself as in a helix. However, there may be minor departures from a strict helical shape, as the design of the cooling channel is finalized. Thus, "generally helical" refers simply to a design that wraps about itself and about a central axis of the cavity in the part, and no strict mathematical definition of "helical" should be drawn from the term "generally helical" for purposes of this application.

In FIG. 2 a top view of FIG. 1 is shown. As can be seen in FIG. 2, inner rim 14 defines a part having a circular outer contour. A set of locator holes 22 is provided in the top surface 21 of the cavity portion 10 to aid in positioning a core portion (not shown) within the cavity portion 10.

Figures 3, 4:
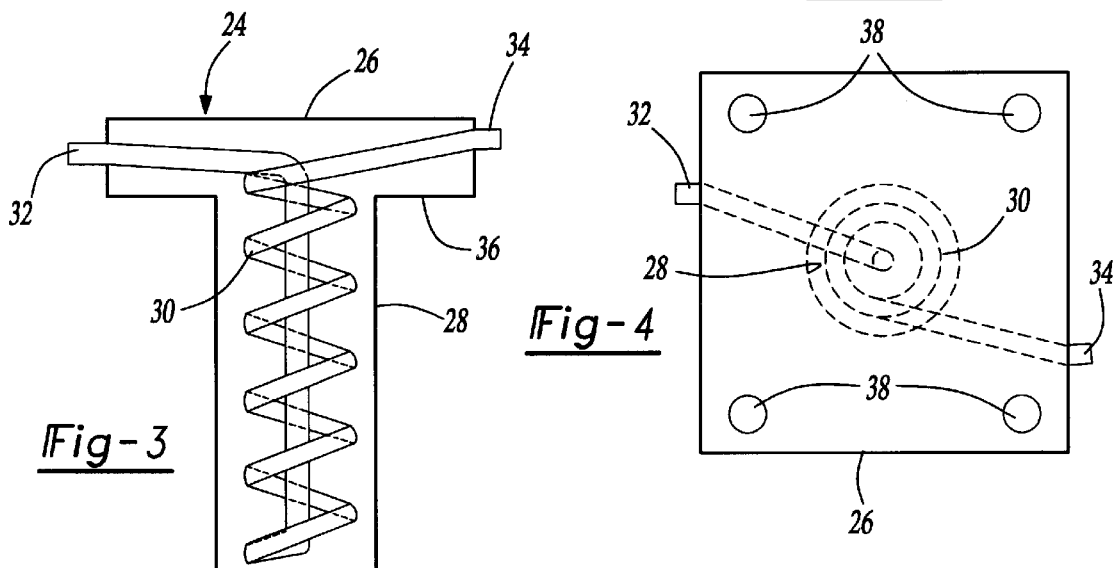
FIG. 3 is a cross sectional view of a core portion of a tool having an internal, conformal, helical-shaped channel.
FIG. 4 is a top view of FIG. 3.

In FIG. 3 a core portion of the tool is shown generally at 24. The core portion 24 has a top section 26 and an outer contour 28. The shape of the outer contour 28 defines the inner contour of the part produced by using the cavity portion 10 in conjunction with the core portion 24. A core channel 30 is formed within the core portion 24. In FIG. 3 the core channel 30 is shown in the shape of a helix which conformally follows the outer contour 28. The core channel 30 has a first end 32 and a second end 34. The core channel 30 provides a passage for a fluid (not shown) to be circulated through the core portion 24 of the tool. The fluid can be used to either heat or cool the core portion 24. The core portion 24 also has a lower surface 36.

In FIG. 4 a top view of FIG. 3 is shown. As can be seen in FIG. 4, in this example tool the outer contour 28 of the core portion 24 defines a circular inner contour of the part. The top section 24 of the core portion 24 includes a set of locator holes 38 which correspond to the locator holes 22 in the cavity portion 10. A set of pins or bolts (not shown) are inserted into the locator holes 22 and 38 to hold the core portion 24 within the cavity portion 10.

To assemble the example tool the lower surface 36 of the core portion 24 is placed on top of the top surface 21 of the cavity portion 10 and the pins or bolts are placed in the locator holes 22 and 38. When the core portion 24 and the cavity portion 10 are assembled into the tool a space (not shown) between the inner rim 14 and the outer contour 28 defines the shape of the part. In this example tool the shape is that of a cylinder having one end sealed. In an injection mold tool, the space is in communication with a supply of material to be molded into the part under pressure by means of a sprue and gate (not shown) provided in the cavity portion 10 or the core portion 24 as is well known in the industry. As will be understood by those skilled in the art the part could have any inner and outer contour desired, the contours shown in FIGS. 1–4 are only by way of illustration.

One method for calculating the theoretical heat transfer between the part and the fluid in an internal channel in the tool is finite element analysis. Iterative calculations of the theoretical heat transfer by finite element analysis can be rapidly accomplished by using a computer aided design program. One example of such a program is C-Mold. To calculate the theoretical heat transfer within the cavity portion 10 of the example tool by finite element analysis using C-Mold an operator must first input a set of data points which define the inner and the outer contour of the part. Next data points which represent the initial shape of cavity channel 16 and the core channel 30 and their placement relative to the outer and the inner contours of the part respectively must be entered. Then data values which define: the physical characteristics of the fluid to be circulated through the cavity channel 16 and the core channel 30; the material to be molded into the part by the tool; the physical characteristics of the tool material; and the conditions of a cycle of use of the tool must be entered. From those data points the C-Mold program then generates a graphic of the part, the cavity channel 16 and the core channel 30. The C-Mold program then calculates the theoretical heat transfer between the part and the fluid in the cavity channel 16 and the core channel 30. The C-Mold program also provides a graphic illustrating the theoretical heat transfer between the part and the fluid in the core channel 16 and the cavity channel 30. In addition, the C-Mold program provides data on the mold wall temperature differences and the time required to cool to a selected temperature for numerous points located on the inner and the outer contours of the part. This data can be used to located potential regions of non-homogeneous heat transfer within the tool. The C-mold program also permits an operator to then change the characteristics of the cavity channel 16 and the core channel 30 such as their cross sectional shape, their distance from a contour of the part, and their shape about the cavity portion 10 or the core portion 24, respectively. After the changes are made the operator can run another iteration of the C-Mold program to create a new set of graphics. This sequence of changes can be repeated until the heat transfer within the mold is nearly homogeneous. As will be understood by those skilled in the art the operator can also evaluate changes in the physical characteristics of the fluid to be circulated through the cavity channel 16 and the core channel 30; the material to be molded into the part by the tool; the physical characteristics of the tool material; and the conditions of a cycle of use of the tool. Evaluation of such changes are not the focus of this invention.

Numerous evaluations of tools using the C-Mold program has revealed that a helical shaped channel provides the most uniform heat transfer within a tool. In addition, it is believed that an elliptical cross sectional shape to the channels will be more efficient than a circular cross section due to the increased projected surface area.

After a model providing a nearly homogeneous heat transfer has been achieved the C-Mold model data must be converted into a solid form model data set. One program capable of converting C-Mold data into a solid form model is Pro-Engineer. The solid form model data set is then used to create the tool. The tool can be created from the solid form model by three dimensional printing, selective laser sintering, fused deposition modeling, stereolithography or other free-form methods. The term "free-form" methods as utilized in this application refers to the types of fabrication method wherein a part is made by laying down layers of materials in sequence to form the part. There are many known methods.

Figure 5:
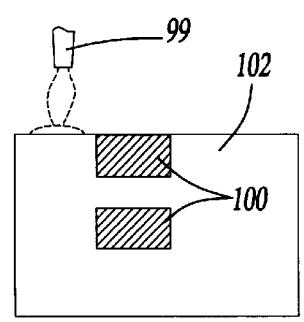
FIG. 5 schematically shows the manufacturing step of this invention.

The method of three dimensional printing is described in U.S. Pat. Nos. 5,204,055, 5,340,656, 5,387,380. Briefly, in the process of three dimensional printing the tool is created by spreading a layer of powder with a roller within a confined region. A binder is then sprayed through an ink-jet sprayer over selective regions of the powder layer. The powder binds to the layer below it only in regions where the binder is sprayed. Then another layer of powder is spread and the binding step is repeated. Unbound powder temporarily supports unconnected portions of the tool allowing overhangs, undercuts, and internal volumes to be created. The powder can be composed of either a polymer, a metal, a ceramic, or combinations of them. Thus, the tool is built up layer by layer with the cavity channel 16 and the core channel 30 being created as regions of unbound powder. This is shown schematically in FIG. 5, a tool 99 deposits material with the channel being formed of the unbounded portions 100 and the tool from the bounded areas 102. Once the tool is fully formed the unbound powder is removed from the cavity channel 16 and the core channel 30 by methods well known in the art. Such methods include vibration and blowing compressed air in the channel. In order to further solidify a tool created by three dimensional printing the pores in the tool are filled by first sintering the tool and then infiltrating it with a lower melting point alloy. Such post-three dimensional printing processing methods are well known in the art.

Figure 6:
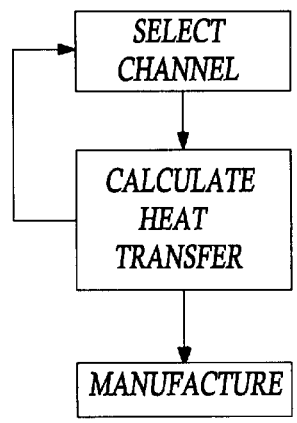
FIG. 6 is a flowchart of the method.

The method of designing and forming the tools is illustrated by the flowchart of FIG. 6.

The foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A method for the manufacture of a tool for producing a part, the tool having internal cavity channels including the steps of:

a.) creating a three-dimensional graphic of a tool formed from a tool material having a body with an inner rim defining a contour of a cavity part;

b.) creating a three-dimensional graphic of at least one generally helical internal cavity channel having a pre-defined cross-sectional shape and which spirals around said inner rim in said body;

c.) placing said internal cavity channel adjacent said inner rim and spaced from said inner rim a pre-determined distance;

d.) defining a use cycle of said tool and the physical characteristics of a fluid to be circulated through said internal cavity channel, a part material and said tool material;

e.) calculating a theoretical heat transfer between said fluid and said part material at a plurality of points along said internal cavity channel during said use cycle based on the physical characteristics;

f.) identifying areas of non-homogenous theoretical heat transfer between said fluid and said part material;

g.) modifying at least one of said pre-defined cross-sectional shape and said pre-determined distance and then repeating steps b.), c.), e.) and f.);

h.) repeating step g.) to produce a design of said tool having substantially no areas of non-homogenous theoretical heat transfer between said fluid and said part material;

i.) creating said tool in accordance with said design of step h.) by a solid freeform method, said tool having said inner rim corresponding to said contour of said cavity part and said tool including said internal cavity channel.

2. The method as defined in claim 1, wherein said cavity channel is defined to be identically in the shape of a helix.

3. The method as defined in claim 1, wherein a computer aided design program uses finite element analysis to perform step e.).

4. The method as defined in claim 1, wherein said solid freeform method for creating said tool is three dimensional printing.

5. The method as defined in claim 1, wherein said tool is a single part tool for producing a solid part.

6. The method as defined in claim 1, wherein said tool includes two parts for defining a cavity, with a cavity portion and a core portion.

7. The method as defined in claim 1, wherein said pre-defined cross-sectional shape is a generally elliptic shape.

* * * * *